United States Patent
Wang et al.

(10) Patent No.: US 11,575,291 B2
(45) Date of Patent: Feb. 7, 2023

(54) MOTOR WITH COOLANT BLOCKING MEMBER ON END PORTION OF WINDING, POWERTRAIN, AND VEHICLE

(71) Applicant: Huawei Digital Power Technologies Co., Ltd., Shenzhen (CN)

(72) Inventors: Jiangang Wang, Dongguan (CN); Quanming Li, Dongguan (CN); Jun Wen, Dongguan (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/501,247

(22) Filed: Oct. 14, 2021

(65) Prior Publication Data

US 2022/0037955 A1 Feb. 3, 2022

Related U.S. Application Data

(63) Continuation of application No. PCT/CN2020/082615, filed on Mar. 31, 2020.

(30) Foreign Application Priority Data

Jul. 8, 2019 (CN) .......................... 201910611288.9

(51) Int. Cl.
   *H02K 5/20* (2006.01)
   *H02K 9/193* (2006.01)
   *B60K 11/02* (2006.01)

(52) U.S. Cl.
   CPC .............. *H02K 5/203* (2021.01); *B60K 11/02* (2013.01); *H02K 9/193* (2013.01)

(58) Field of Classification Search
   None
   See application file for complete search history.

(56) References Cited

U.S. PATENT DOCUMENTS

| | | |
|---|---|---|
| 5,682,074 A | 10/1997 | Di Pietro et al. |
| 10,103,602 B2 | 10/2018 | Kitta et al. |
| | (Continued) | |

FOREIGN PATENT DOCUMENTS

| | | |
|---|---|---|
| CN | 102195409 A | 9/2011 |
| CN | 102820738 A | 12/2012 |
| | (Continued) | |

OTHER PUBLICATIONS

Office Action issued dated Sep. 7, 2020, in connection with corresponding Chinese Application No. 201910611288.9 (13 pp., including machine-generated English translation).

(Continued)

*Primary Examiner* — Tulsidas C Patel
*Assistant Examiner* — Robert E Mates
(74) *Attorney, Agent, or Firm* — Maier & Maier, PLLC

(57) ABSTRACT

A motor, a powertrain, and a vehicle. The motor may be applied to an electric motor vehicle/electric vehicle, a pure electric vehicle, a hybrid electric vehicle, a range extended electric vehicle, a plug-in hybrid electric vehicle, a new energy vehicle, battery management, a motor & driver, a power converter, a reducer, or the like. The motor is configured to output power. In a process of outputting power by the motor, a blocking member arranged in the motor blocks the contact between a rotor of the motor and a coolant, so that the coolant does not splash under the centrifugal action of the rotor in the process of rotation, thereby avoiding the kinetic energy consumption of the rotor. Therefore, a rotating speed of the motor is faster, and the output power is greater.

17 Claims, 9 Drawing Sheets

(56) References Cited

U.S. PATENT DOCUMENTS

| | | | |
|---|---|---|---|
| 2009/0015081 A1* | 1/2009 | Takenaka | H02K 1/2766 310/54 |
| 2011/0234029 A1* | 9/2011 | Pal | H02K 1/20 310/54 |
| 2011/0316367 A1 | 12/2011 | Takahashi et al. | |
| 2014/0097713 A1 | 4/2014 | Puiu et al. | |
| 2014/0208882 A1* | 7/2014 | Garabello | F16H 57/0446 74/473.11 |
| 2014/0339934 A1* | 11/2014 | Yoshiizumi | H02K 9/19 310/54 |
| 2017/0063201 A1* | 3/2017 | Kitta | H02K 3/28 |
| 2019/0020231 A1* | 1/2019 | Dlala | H02K 1/16 |
| 2019/0131851 A1* | 5/2019 | Herb | H02K 9/19 |
| 2019/0190350 A1* | 6/2019 | Ito | F16H 57/043 |
| 2020/0204044 A1* | 6/2020 | Lee | H02K 9/12 |

FOREIGN PATENT DOCUMENTS

| | | |
|---|---|---|
| CN | 103683673 A | 3/2014 |
| CN | 205566953 U | 9/2016 |
| CN | 206124802 U | 4/2017 |
| CN | 107306056 A | 10/2017 |
| CN | 108336865 A | 7/2018 |
| CN | 207705951 U | 8/2018 |
| CN | 207939353 U | 10/2018 |
| CN | 109217541 A | 1/2019 |
| CN | 110492663 A | 11/2019 |
| EP | 2 369 723 A2 | 9/2011 |
| JP | S50146812 A | 11/1975 |
| JP | 2013135577 A | 7/2013 |
| JP | 2014030284 A | 2/2014 |
| JP | 2014225969 A | 12/2014 |
| JP | 2017118688 A | 6/2017 |
| JP | 2019106776 A | 6/2019 |
| WO | 2010058278 A2 | 5/2010 |
| WO | 2011101911 A1 | 8/2011 |
| WO | WO-2018235969 A1 * | 12/2018 ............ H02K 1/145 |

OTHER PUBLICATIONS

Notification to Grant Patent dated Dec. 21, 2020, in connection with corresponding Chinese Application No. 201910611288.9 (3 pp., including machine-generated English translation).

* cited by examiner

MOTOR WITH COOLANT BLOCKING MEMBER ON END PORTION OF WINDING, POWERTRAIN, AND VEHICLE

CROSS-REFERENCE TO RELATED APPLICATIONS

This application is a continuation of International Application No. PCT/CN2020/082615, filed on Mar. 31, 2020, which claims priority to Chinese Patent Application No. 201910611288.9, filed on Jul. 8, 2019. The disclosures of the aforementioned applications are hereby incorporated by reference in their entireties.

TECHNICAL FIELD

Embodiments relate to the field of motors, and in particular, to a motor adopting oil cooling at an end portion of a coil, a powertrain, and a vehicle.

BACKGROUND

A motor is an electromagnetic device that implements power conversion or transmission according to the law of electromagnetic induction. A main function is to generate driving torque and serve as a power source of electric devices or various machines. The motor mainly includes a housing and a front end cover and a rear end cover located at two ends of the housing. Inner walls of the housing, the front end cover, and the rear end cover are surrounded to form a cavity in which a stator, a rotor, a coil, and a rotating shaft with one end extending from the front end cover and the other end being rotatably connected to the rear end cover are disposed. When the motor runs at a high speed, the coil generates a lot of heat. Therefore, cold water or an oil cooling manner is often adopted to dissipate heat for the motor. As a cooling medium, water has problems such as low power density of a water-cooled motor, large link thermal resistance, high interface thermal resistance ratio, needing to be filled with glue at an end portion of the coil, and lack of high-speed oil seal production. Therefore, oil cooling is increasingly widely used.

At present, when the motor adopts oil cooling, a specific implementation is: a metal pipe is disposed in the housing of the motor, and two ends of the metal pipe extend from the front end cover and the rear end cover to an end portion of the rotor. The metal pipe is provided with holes, cooling oil in the metal pipe is sprayed from the holes to the stator and the end portion of the coil and from openings at the two ends of the metal pipe to the end portion of the rotor under the action of pressure, and the cooling oil covers a yoke portion of the stator and the end portion of the coil from top to bottom under the action of gravity, and finally flows to a reducer from an oil collecting channel at the bottom. At the same time, the cooling oil is splashed to the end portion of the coil under the centrifugal action of the rotor in a rotation process, to enhance a cooling effect of the coil.

However, in the foregoing oil cooling manner, when the rotor sprays the cooling oil to the end portion of the coil by using the centrifugal action in the rotation process, kinetic energy of the rotor needs to be consumed. In this case, the proportion of kinetic energy of the motor consumed by spraying oil by the rotor increases under the trend of high rotating speed of the motor. Finally, the rotating speed of the rotor is greatly affected.

SUMMARY

Embodiments provide a motor, a powertrain, and a vehicle to reduce or avoid a kinetic energy loss of an oil-cooled motor at a high rotating speed, thereby resolving the problem of kinetic energy consumption caused when a rotor in the existing motor sprays cooling oil to an end portion of a coil under the centrifugal action.

An embodiment provides a motor, including a housing, where a rotating shaft, a rotor, and a stator that are sequentially sleeved are disposed in the housing, a coil winding is arranged around the stator, and two ends of the rotating shaft are respectively rotatably connected to two opposite side end faces of the housing by using a bearing.

The housing has a cooling channel that may be used for a coolant to flow through and whose two ends extend to an end portion of the coil winding, the cooling channel is in communication with a first opening and a second opening respectively provided at a top end and a bottom end of the housing, and the cooling channel has a nozzle at a position proximate the end portion of the coil winding, where the nozzle is configured to spray the coolant in the cooling channel to the end portion of the coil winding.

The motor further includes:

at least one blocking member, where the blocking member is located at least on an inner surface or an outer surface of the end portion of the coil winding, and the blocking member is blocked between the nozzle and the rotor.

In the motor provided in this embodiment, the housing has the cooling channel that may be used for the coolant to flow through and whose two ends extend to the end portion of the coil winding, the cooling channel is in communication with the first opening and the second opening respectively provided at the top end and the bottom end of the housing, and the cooling channel has the nozzle at the position close to the end portion of the coil winding, where the nozzle is configured to spray the coolant in the cooling channel to the end portion of the coil winding. The motor further includes at least one blocking member, where the blocking member is located at least on the inner surface or the outer surface of the end portion of the coil winding, and the blocking member is blocked between the nozzle and the rotor, so that when the coolant in the cooling channel is sprayed from the nozzle to dissipate heat for the coil winding, the coolant cannot come into contact with the rotor under the blocking action of the blocking member, and the coolant is guided by the blocking member to an area away from the rotor and a lower area of the end portion of the coil winding, thereby avoiding the contact between the coolant and the rotor while cooling the coil winding, and reducing or avoiding kinetic energy consumption of the rotor. Therefore, the motor provided in this embodiment prevents the coolant from penetrating or overflowing into the area of the rotor from the end portion of the coil winding, and avoids the problem of kinetic energy consumption caused by the rotor in contact with the coolant, thereby resolving the problem of kinetic energy consumption of the rotor caused by the rotor in the existing motor sprays cooling oil to the end portion of the coil under the centrifugal action.

In a possible implementation of the first aspect, the blocking member has a guide portion at a position close to the top end of the housing, where the guide portion is configured to guide a part of the coolant on the blocking member to the bearing, so that the coolant flows through the bearing to an end portion that is of the coil winding and that is close to the bottom end of the housing.

In this way, a part of the coolant penetrating into the blocking member flows along two ends of the blocking member to a lower semi-circular end portion of the coil winding for cooling, a part of the coolant flows along the guide portion to the bearing to dissipate heat for the bearing, and the coolant flowing through the bearing flows to a lower end portion of the coil winding under the action of gravity, to cool the lower end portion of the coil winding. Compared with the prior art in which the coolant first flows through the upper end portion of the coil winding for cooling and then flows along the coil winding to the lower end portion of the coil winding for cooling, balanced heat dissipation of the upper and lower end portions of the coil winding is implemented in this embodiment.

In a possible implementation of the first aspect, the blocking member is a semi-arc structure arranged around at least an inner surface or an outer surface of an upper semi-circular end portion of the coil winding.

In this way, the semi-arc structure can block the coolant on the upper semi-circular end portion of the coil winding to prevent the coolant from penetrating or overflowing into the area of the rotor, and the semi-arc structure guides the coolant to the lower semi-circular end portion of the coil winding. Moreover, in this embodiment, when the blocking member adopts the semi-arc structure, a material of the blocking member is saved while the weight of the blocking member is reduced on the premise that the coolant cannot come into contact with the rotor.

In a possible implementation of the first aspect, the blocking member is a semi-arc separator arranged around an inner surface of the upper semi-circular end portion of the coil winding, one end of the semi-arc separator is connected to an inner wall of the housing, and a space that may be accommodated by the upper semi-circular end portion of the coil winding is formed between an arc surface of the semi-arc separator and the inner wall of the housing, so that the semi-arc separator is located on the inner surface of the upper semi-circular end portion of the coil winding.

In this way, during installation, the semi-arc separator can be directly first installed on the inner wall of the housing, and after the installation, one end of the semi-arc separator extends into the inner surface of the upper semi-circular end portion of the coil winding, to block and guide the coolant penetrating or overflowing from the upper semi-circular end portion of the coil winding, so that the coolant cannot come into contact with the rotor, thereby avoiding kinetic energy consumption of the rotor.

In a possible implementation of the first aspect, one end that is of the semi-arc separator and that is connected to the housing has a connection portion, and the semi-arc separator is connected to the inner wall of the housing by using the connection portion.

The connection portion implements the installation of the semi-arc separator and the inner wall of the housing, and implements convenient installation of the semi-arc separator.

In a possible implementation of the first aspect, the guide portion is a through hole provided on the semi-arc separator at a position close to the connection portion, and a projection area of the through hole in a vertical direction is located on the bearing, so that the coolant flows to the bearing through the through hole.

In this way, when the coolant on the upper semi-circular end portion of the coil winding flows to the semi-arc separator, a part of the coolant flows to the bearing through the through hole, and the rest of the coolant flows along the semi-arc separator to the lower semi-circular end portion of the coil winding, thereby implementing the contact between the coolant and the bearing, which enhances a heat dissipation capability of the bearing at a high rotating speed.

In a possible implementation of the first aspect, the blocking member is a semi-arc plate arranged around the outer surface of the upper semi-circular end portion of the coil winding, where the semi-arc plate is connected to an inner wall of the housing, and a gap in communication with the nozzle of the cooling channel is formed between the semi-arc plate and the inner wall of the housing, so that the coolant flows along the semi-arc plate to the bearing and the lower semi-circular end portion of the coil winding.

In this way, the coolant sprayed from the nozzle at the top end of the cooling channel enters the gap, and the coolant flows along the semi-arc plate to the bearing and the lower semi-circular end portion of the coil winding. In other words, the semi-arc plate has a guide effect, which avoids the contact between the coolant and the rotor, thereby avoiding kinetic energy consumption of the rotor. At the same time, when the semi-arc plate is located on the outer surface of the upper semi-circular end portion of the coil winding, two ends of the semi-arc plate directly guide a part of the coolant to the lower semi-circular end portion of the coil winding, thereby cooling the lower semi-circular end portion of the coil winding. Compared with the prior art, the problem of unbalanced heat dissipation of the upper and lower end portions of the coil winding caused after the coolant comes into contact with the upper semi-circular end portion of the coil winding and then flows to the lower semi-circular end portion of the coil winding for cooling is avoided.

In a possible implementation of the first aspect, the guide portion is an outer edge that is inclined downward and that is formed by one end of the semi-arc plate extending outward to the side end face of the housing, and the outer edge at least partially overlaps with the bearing in a vertical direction, so that a part of the coolant in the gap flows to the bearing through the outer edge.

In this way, a part of the coolant is directly guided along the outer edge of the semi-arc plate, and the coolant flowing to the bearing does not come into contact with the end portion of the coil winding. In other words, in this embodiment, pipes for cooling the coil winding and the bearing respectively are formed. At the same time, after the coolant flowing to the bearing cools the bearing, the coolant flows to the lower end portion of the coil winding, thereby cooling the lower end portion of the coil winding and avoiding the problem of unbalanced heat dissipation of the upper and lower end portions of the coil winding when the coolant sequentially cools the end portions of the coil winding from top to bottom.

In a possible implementation of the first aspect, a plurality of holes are provided on the semi-arc plate, so that a part of the coolant in the gap penetrates into the end portion of the coil winding.

In this way, a part of the coolant penetrates into the upper semi-circular end portion of the coil winding through the holes for cooling, to dissipate heat for the upper semi-circular end portion of the coil winding.

In a possible implementation of the first aspect, the blocking member is a semi-arc oil-wrapped cloth wrapped on the inner surface of the upper semi-circular end portion of the coil winding.

When the blocking member adopts the oil-wrapped cloth, because the oil-wrapped cloth is a flexible material, during assembly, the oil-wrapped cloth can be directly wrapped on the end portion of the coil winding, and an installation position of the oil-wrapped cloth can be adjusted at any time, thereby greatly reducing the difficulty of fitting between the blocking member and the end portion of the coil winding, and implementing convenient installation.

In a possible implementation of the first aspect, one end that is of the oil-wrapped cloth and that is close to an outer side face of the end portion of the coil winding has an extension portion extending to an outer side face of the upper semi-circular end portion of the coil winding, and the guide portion is an opening provided on the extension portion, so that a part of the coolant sprayed to the coil winding flows to the bearing.

In this way, the coolant on the upper semi-circular end portion of the coil winding is sprayed to the bearing through the opening on the extension portion, thereby dissipating heat for the bearing.

In a possible implementation of the first aspect, the housing is provided with an oil collecting groove at a position close to a top end of the bearing or on a top end of the bearing, and the oil collecting groove is configured to collect the coolant flowing to the bearing, so that the coolant flows into the bearing.

The coolant flowing out is centrally guided to the bearing through the oil collecting groove to effectively dissipate heat for the bearing. Moreover, the oil collecting groove is provided to buffer the coolant flowing to the bearing, thereby preventing the coolant flowing to the bearing from splashing around the bearing due to excessive pressure.

In a possible implementation of the first aspect, the housing is provided with a guide groove at a position close to a bottom end of the bearing, and the guide groove is configured to guide the coolant on the bearing into the lower semi-circular end portion of the coil winding.

The coolant on the bearing is guided into the lower semi-circular end portion of the coil winding through the guide groove, so that the coolant can cool the lower semi-circular end portion of the coil winding. Compared with the prior art, in this embodiment, because a part of the coolant flows directly to the bearing, but heat of the bearing is far lower than heat of the coil winding, after the coolant flows through the bearing, the temperature rise is not very high. Under the guide action of the guide groove, the coolant flows to the lower semi-circular end portion of the coil winding, to dissipate heat for the lower semi-circular end portion of the coil winding, thereby implementing balanced heat dissipation of the upper and lower end portions of the coil winding.

In a possible implementation of the first aspect, the motor further includes an oil guide member, where the oil guide member is disposed on the inner surface of the lower semi-circular end portion of the coil winding, one end of the oil guide member is close to the guide groove, the other end is close to the rotor, and an orifice that may be used for the coolant to flow through is provided on the oil guide member, so that the coolant penetrates into a bottom side of the lower semi-circular end portion of the coil winding.

In this way, the coolant flows under the guide of the oil guide member to a position at which the lower semi-circular end portion of the coil winding is close to the inner surface of the rotor, and the coolant penetrates into the lower semi-circular end portion of the coil winding through the orifice, thereby implementing balanced heat dissipation of the lower semi-circular end portion of the coil winding.

In a possible implementation of the first aspect, a protrusion is provided on an edge that is of one end of the oil guide member and that is close to the rotor, and the protrusion is configured to block the coolant on the oil guide member from flowing into the rotor.

The protrusion on the oil guide member prevents the coolant on the oil guide member from coming into contact with the rotor, thereby further avoiding kinetic energy consumption of the rotor.

In a possible implementation of the first aspect, an outer wall of the stator and an inner surface of the housing are surrounded to form the cooling channel, and the nozzle is formed between two ends of the stator and the inner surface of the housing.

In a possible implementation of the first aspect, a groove is provided on an inner wall that is of the housing and that is close to the stator, the groove and the outer wall of the stator are surrounded to form the cooling channel, and a notch that is on the groove and that is close to the end portion of the coil winding forms the nozzle.

In a possible implementation of the first aspect, the cooling channel is provided in the housing close to the inner wall of the stator, and the nozzle in communication with the cooling channel is provided on the inner wall of the housing.

In a possible implementation of the first aspect, the housing includes an intermediate housing and a front end cover and a rear end cover located at two ends of the intermediate housing, inner walls of the intermediate housing, the front end cover, and the rear end cover are surrounded to form a cavity that may accommodate the stator, the coil winding, the rotor, and the rotating shaft, and two ends of the rotating shaft are respectively connected to the front end cover and the rear end cover by using the bearing.

The cooling channel is disposed in the intermediate housing or between the intermediate housing and the outer wall of the stator.

This facilitates the assembly of the components in the motor in the housing.

In a possible implementation of the first aspect, the motor further includes an oil pump, where an inlet of the oil pump is in communication with one of the first opening and the second opening, and an outlet of the oil pump is in communication with the other of the first opening and the second opening.

In this way, on one hand, the flow of the coolant in the cooling channel can be ensured; on the other hand, and the flow rate of the coolant in the cooling channel can be controlled.

In a possible implementation of the first aspect, the motor further includes a heat exchanger, where the heat exchanger is configured to cool the coolant discharged from the cooling channel.

In this way, the heat exchanger can cool the discharged coolant, and after cooling, the coolant can re-enter the cooling channel to cool the motor, thereby ensuring that the temperature of the coolant is not excessively high.

In a possible implementation of the first aspect, the motor further includes a filter, where the filter is configured to filter the coolant discharged from the outlet of the oil pump.

In this way, the blocking of the cooling channel, the first opening, and the second opening caused by impurities in the coolant is avoided.

An embodiment further provides a powertrain, including the foregoing motor and a reducer connected to a rotating shaft of the motor, where a heat dissipation channel is disposed in the reducer, and the heat dissipation channel and a cooling channel in the motor form a cooling loop.

By including the motor and the reducer, kinetic energy consumption of the rotor at a high rotating speed is avoided, and integrated cooling of the motor and the reducer is implemented, so that better heat dissipation of the powertrain is implemented.

In a possible implementation of the second aspect, an oil pump, a heat exchanger, and a filter in the motor are located in the reducer.

This makes the structure of the powertrain more compact.

An embodiment further provides a vehicle, including at least wheels, a transmission component, and the foregoing motor, where a rotating shaft of the motor is connected to the wheels by using the transmission component.

In the vehicle provided in this embodiment, by including the motor, the contact between a rotor of the motor and a coolant is blocked, thereby avoiding kinetic energy consumption in a rotation process of the rotor of the motor, so that a rotating speed of the rotor of the motor is faster, and kinetic energy output by the rotating shaft is greater. In this way, power of the vehicle is greater.

These and other aspects, implementation forms, and advantages of exemplary embodiments are apparent from the embodiments described below in combination with the accompanying drawings. However, it should be understood that the embodiments and the accompanying drawings are merely for illustration and are not intended as a definition of limitation to the embodiments. Other aspects and advantages of embodiments will be set forth in the following description and will be apparent in part from the description or from the practice of the embodiments.

DETAILED DESCRIPTION OF THE EMBODIMENTS

Figure 1:
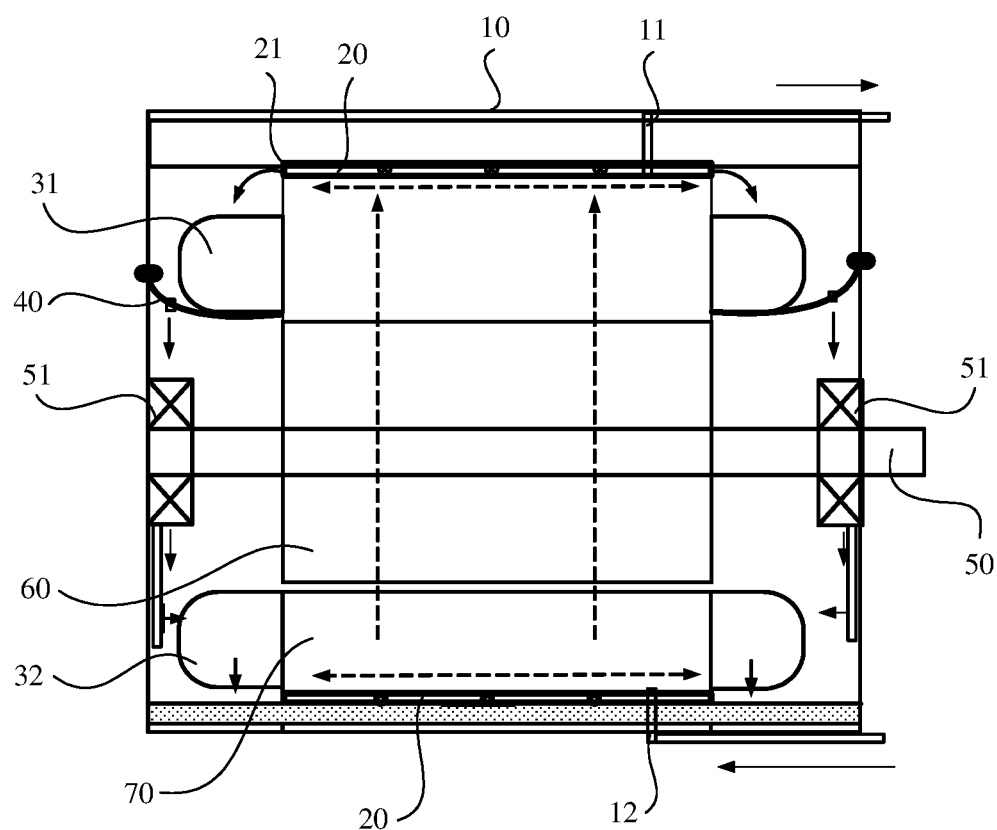
FIG. 1 is a schematic diagram of a side view structure and a coolant flow path inside a motor according to Embodiment 1.
Figure 2:
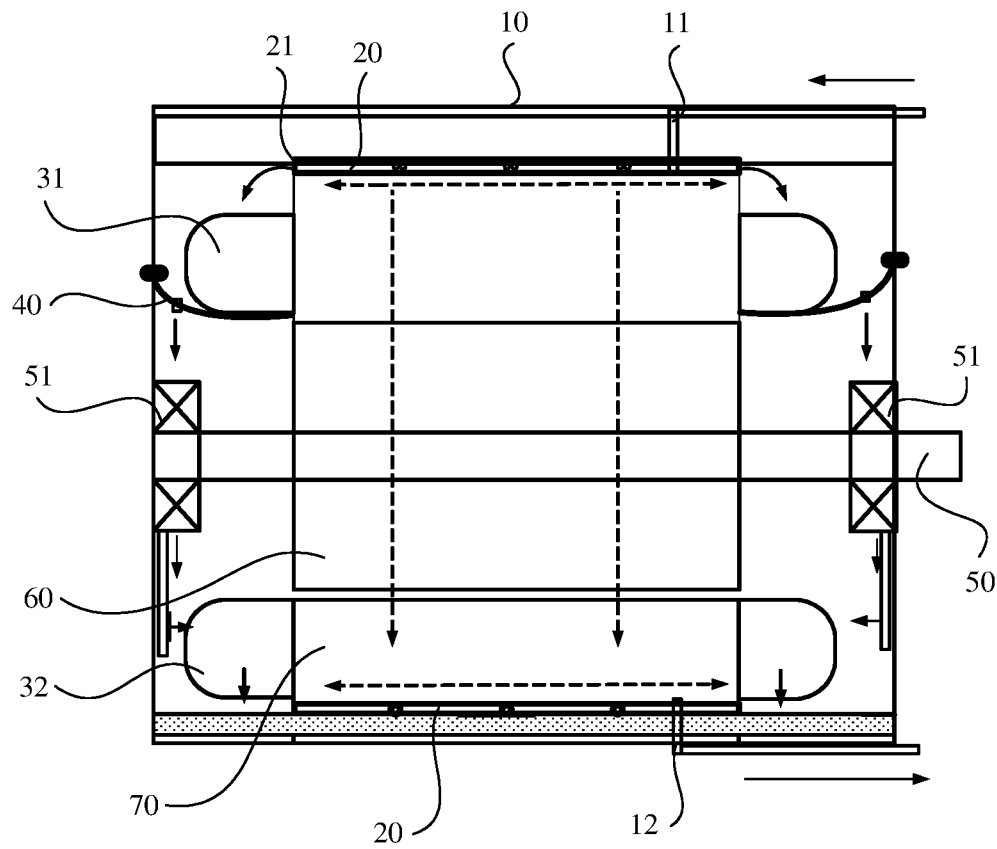
FIG. 2 is a schematic diagram of a side view structure and another coolant flow path inside a motor according to Embodiment 1.
Figure 3:
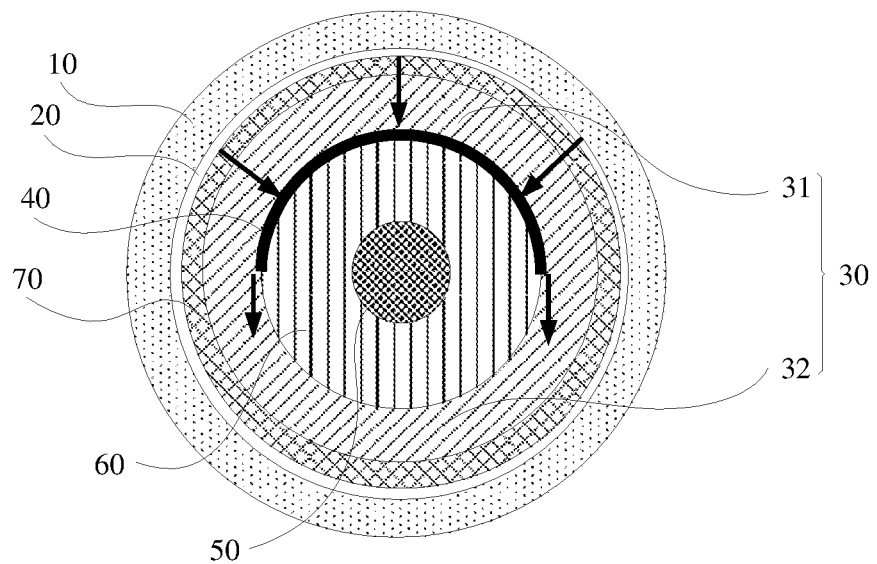
FIG. 3 is a schematic diagram of a cross-sectional structure of a motor according to Embodiment 1.
Figure 4:
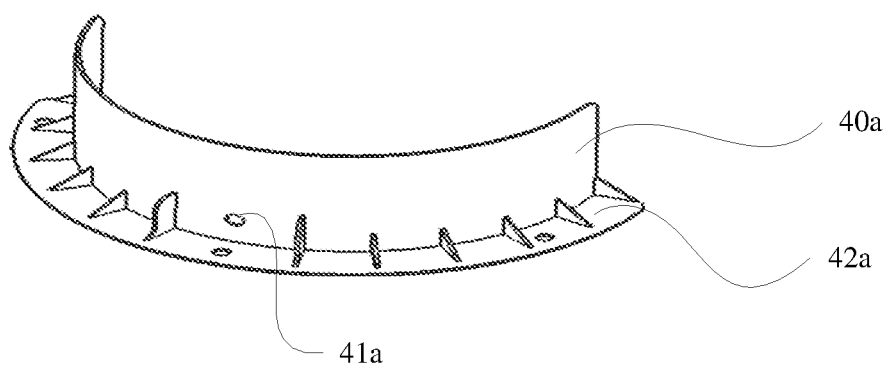
FIG. 4 is a schematic structural diagram of a blocking member in a motor according to Embodiment 1.
Figure 5:
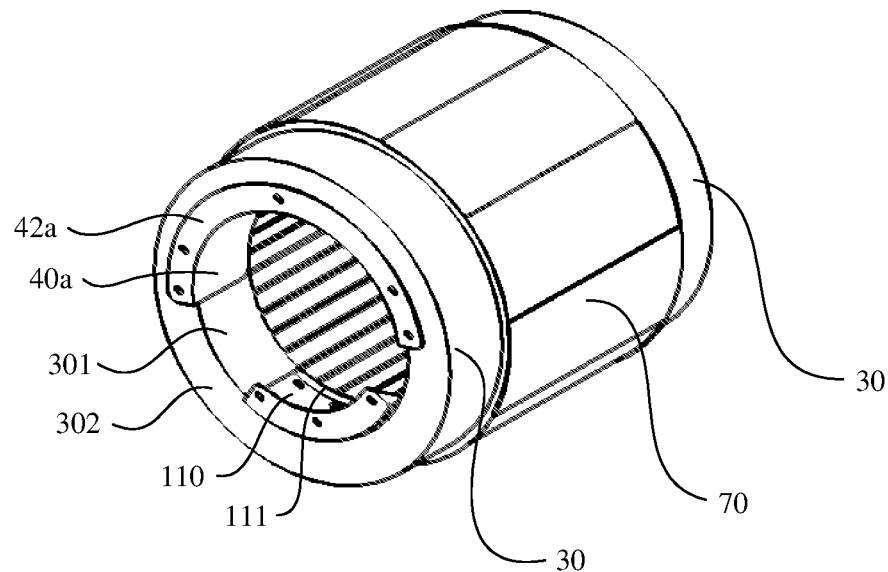
FIG. 5 is a schematic structural diagram of a blocking member and a stator in a motor according to Embodiment 1.
Figure 6:
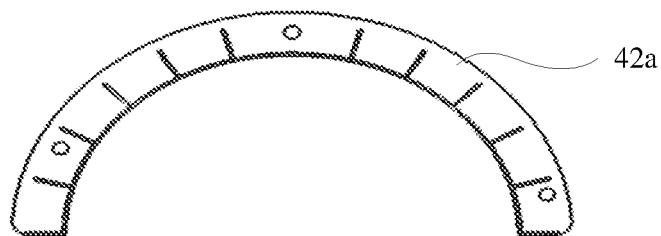
FIG. 6 is a schematic diagram of a main view structure of a blocking member in a motor according to Embodiment 1.
Figure 7:
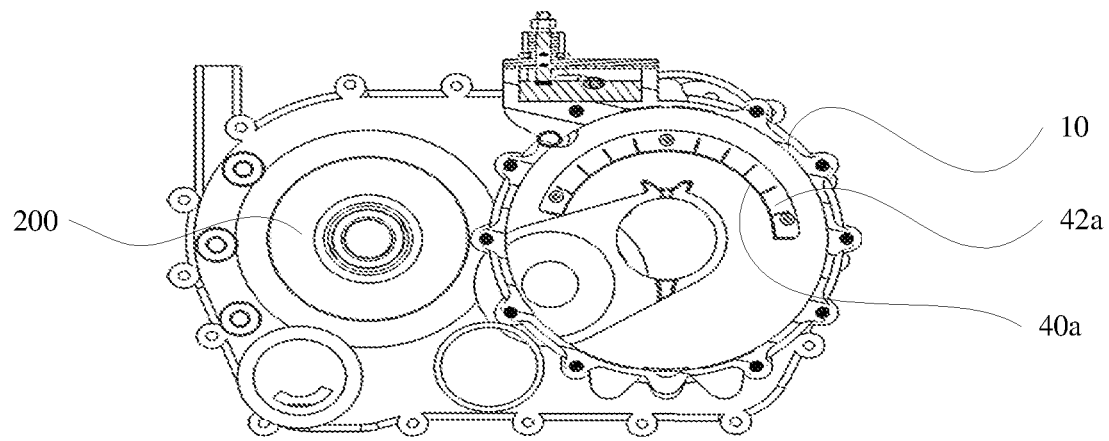
FIG. 7 is a schematic structural diagram in which a blocking member in a motor is assembled on an inner wall of a housing according to Embodiment 1.
Figure 8:
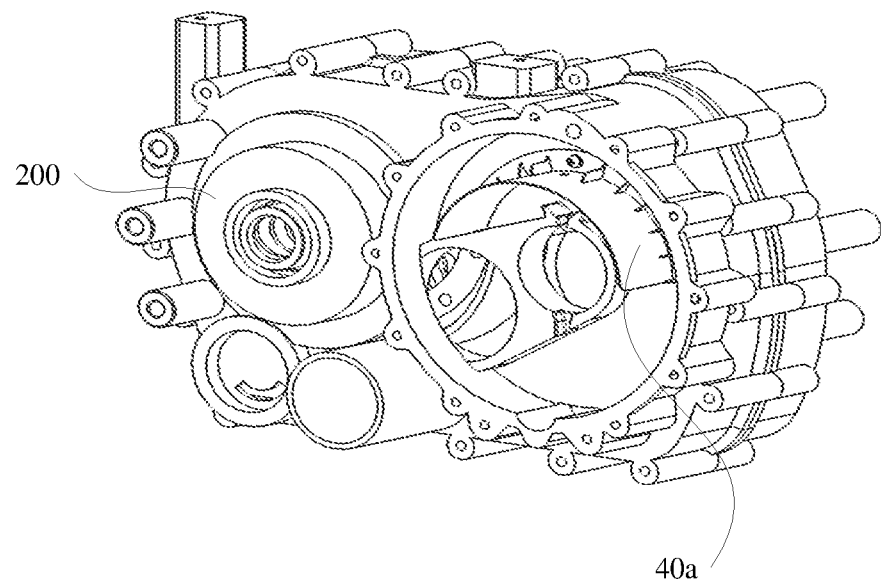
FIG. 8 is a schematic diagram of a three-dimensional structure in which a blocking member in a motor is assembled on an inner wall of a housing according to Embodiment 1.
Figure 9:
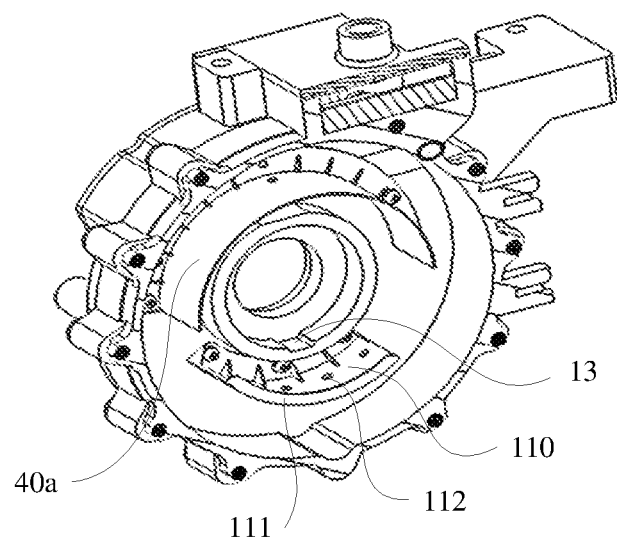
FIG. 9 is a schematic diagram of a three-dimensional structure in another direction in which a blocking member in a motor is assembled on an inner wall of a housing according to Embodiment 1.
Figure 10:
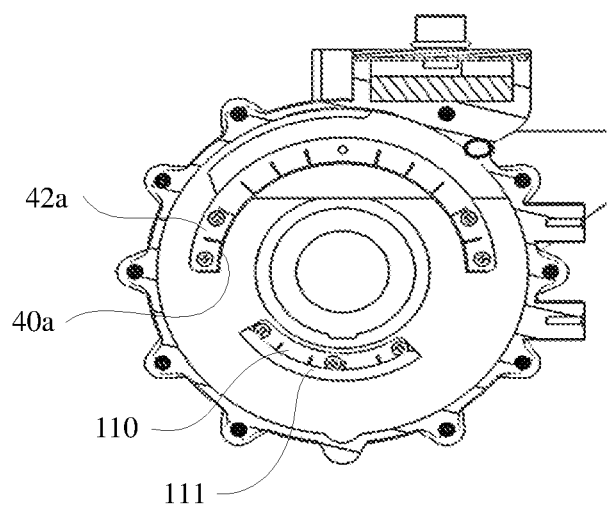
FIG. 10 is a schematic structural diagram of another direction in which a blocking member in a motor is assembled on an inner wall of a housing according to Embodiment 1.
Figure 16:
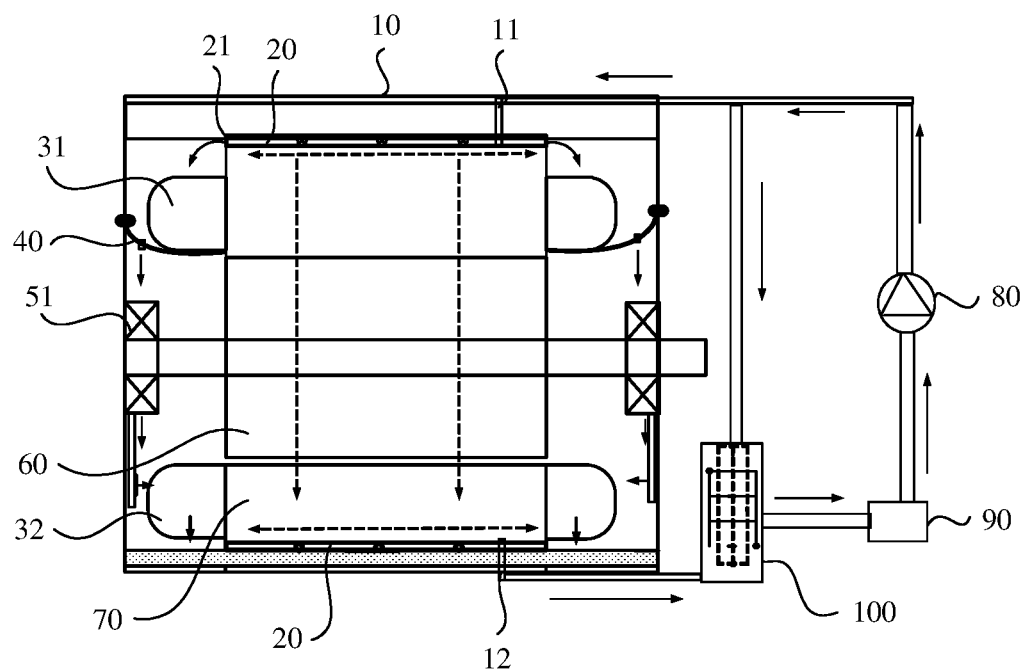
FIG. 16 is a schematic structural diagram between a side view structure inside a motor and an oil pump, a heat exchanger, and a filter inside a motor according to an embodiment.

With respect to Embodiment 1, FIG. 1 is a schematic diagram of a side view structure and a coolant flow path inside a motor, FIG. 2 is a schematic diagram of a side view structure and another coolant flow path inside a motor, FIG. 3 is a schematic diagram of a sectional structure of a motor, FIG. 4 is a schematic structural diagram of a blocking member in a motor, FIG. 5 is a schematic structural diagram of a blocking member and a stator in a motor, FIG. 6 is a schematic diagram of a main view structure of a blocking member in a motor, FIG. 7 is a schematic structural diagram in which a blocking member in a motor is assembled on an inner wall of a housing, FIG. 8 is a schematic diagram of a three-dimensional structure in which a blocking member in a motor is assembled on an inner wall of a housing, FIG. 9 is a schematic diagram of a three-dimensional structure in another direction in which a blocking member in a motor is assembled on an inner wall of a housing, FIG. 10 is a schematic structural diagram of another direction in which a blocking member in a motor is assembled on an inner wall of a housing; and FIG. 16 is a schematic structural diagram between a side view structure inside a motor and an oil pump, a heat exchanger, and a filter according to an embodiment.

As in the Background, the existing motor has the problem of kinetic energy consumption of a rotor, and the cause for the problem is: in an existing motor structure, when the motor adopts an oil cooling manner for cooling, a metal pipe is mainly disposed in a housing, a coolant in the metal pipe sprays cooling oil to a coil winding, a stator, and an end portion of the rotor through openings at two ends of the metal pipe for heat dissipation. The rotor splashes the cooling oil at two ends of the rotor to the end portion of the coil winding under the centrifugal action in a high-speed rotation process of the rotor, to enhance a cooling effect of the coil winding. However, when the rotor sprays the cooling oil to the end portion of the coil in the rotation process, kinetic energy of the rotor needs to be consumed. In this case, the proportion of kinetic energy of the motor consumed by spraying oil by the rotor increases under the trend of high rotating speed of the motor. Finally, the rotating speed of the rotor is greatly affected.

Therefore, in order to resolve the foregoing problem, this embodiment provides a motor. The motor may be applied to an electric motor vehicle/electric vehicle (EV), a pure electric vehicle (Pure Electric Vehicle/Battery Electric Vehicle, PEV/BEV), a hybrid electric vehicle (HEV), a range extended electric vehicle (REEV), a plug-in hybrid electric vehicle (PHEV), a new energy vehicle, battery management, motor & driver, a power converter, a reducer, and the like.

In this embodiment, as shown in FIG. 1 to FIG. 10, the motor includes: a housing 10 and a rotating shaft 50, a rotor 60, and a stator 70 that are sequentially sleeved are disposed in the housing 10. In other words, the rotor 60 is sleeved outside the rotating shaft 50, and the stator 70 is sleeved outside the rotor 60. In this embodiment, the stator 70 is fixed in the housing 10, and the rotor 60 drives the rotating shaft 50 to rotate. In this embodiment, a coil winding is arranged around the stator 70. That the coil winding is arranged around the stator 70 is that several coil slots are evenly distributed on an inner wall of a stator core of the stator 70 along a circumferential direction, and the coil winding is wound in the stator core through the coil slots. In this embodiment, when the coil winding is wound in the stator core, two ends of the coil winding extend outward from two ends of the stator core. In other words, a length of the coil winding is usually greater than a length of the stator 70. Therefore, in this embodiment, end portions 30 of the coil winding are two ends of the coil winding extending from two ends of the stator 70. In this embodiment, two ends of the rotating shaft 50 are respectively rotatably connected to two opposite side end faces of the housing 10 by using a bearing 51. For example, one end of the rotating shaft 50 extends outward from one of the side end faces of the housing 10 to be connected to a load. In this embodiment, one end of the rotating shaft 50 extends from the side end faces of the housing 10 and is connected to an input shaft gear of a reducer.

In this embodiment, in order to cool the motor, the housing 10 has a cooling channel 20 that may be used for a coolant to flow through and whose two ends extend to the end portion 30 of the coil winding. In other words, the cooling channel 20 has a flowing coolant, and two ends of the cooling channel 20 extend to the two end portions 30 of the coil winding. In this embodiment, to facilitate the circulation of the coolant in the cooling channel 20, the cooling channel 20 is in communication with a first opening 11 and a second opening 12 respectively provided at a top end and a bottom end of the housing 10. In other words, the top end and the bottom end of the housing 10 are respectively provided with the first opening 11 and the second opening 12, and the first opening 11 and the second opening 12 are in communication with the cooling channel 20, so that the coolant can enter the cooling channel 20 from the first opening 11 to absorb heat in the housing 10, and is finally discharged outward from the second opening 12, or the coolant can enter the cooling channel 20 from the second opening 12 and is finally discharged outward from the first opening 11.

In this embodiment, because the coil winding generates a lot of heat during operation, in order to cool the coil winding, the cooling channel 20 has a nozzle 21 at a position proximate the end portion 30 of the coil winding, the nozzle 21 is configured to spray the coolant in the cooling channel 20 to the end portion 30 of the coil winding. In other words, the coolant in the cooling channel 20 flows to the end portion 30 of the coil winding through the nozzle 21, to perform cooling and heat dissipation on the coil winding.

When the coolant is sprayed to a top end of the end portion 30 of the coil winding, the coolant flows downward under the action of gravity and usually comes into contact with two ends of the rotor 60. In this way, kinetic energy consumption of the rotor 60 is usually caused. Therefore, in order to reduce or avoid kinetic energy consumption of the rotor 60, in this embodiment, the motor further includes: at least one blocking member 40. The blocking member 40 is located at least on an inner surface 301 or an outer surface 303 of the end portion 30 of the coil winding, and the blocking member 40 is blocked between the nozzle 21 and the rotor 60. In other words, in this embodiment, the blocking member 40 may be disposed on the inner surface 301 of the end portion 30 of the coil winding, so that when the coolant located above is sprayed to the end portion 30 of the coil winding from the nozzle 21, the coolant penetrates downward from a gap between the coil winding under the action of gravity. However, because the blocking member 40 is disposed, under the blocking action of the blocking member 40, the coolant cannot easily come into contact with the rotor 60, thereby avoiding the problem of kinetic energy consumption of the rotor 60 caused by the contact between the coolant and the rotor 60.

Alternatively, in this embodiment, the blocking member 40 may be disposed on the outer surface 303 of the end portion 30 of the coil winding, so that when the coolant is sprayed from the nozzle 21 to the end portion 30 of the coil winding, the coolant is sprayed to the blocking member 40 under the blocking action of the blocking member 40 without coming into contact with the end portion 30 of the coil winding. In this way, the coolant can flow along the end portion 30 of the blocking member 40 to an area away from the rotor 60 and along the blocking member 40 to the underside of the end portion 30 of the coil winding, thereby reducing or avoiding the contact between the coolant and the rotor 60, and further reducing or avoiding the problem of kinetic energy consumption of the rotor 60 caused by the contact between the coolant and the rotor 60.

Alternatively, in this embodiment, the blocking member 40 may be disposed on the inner surface 301 and an outer side face 302 of the end portion 30 of the coil winding, so that the blocking member 40 includes a portion opposite to the inner surface 301 of the end portion 30 of the coil winding and a portion opposite to the outer side face 302 of the end portion 30 of the coil winding. The two portions of the blocking member 40 guide the coolant to the lower portion of the end portion 30 of the coil winding, thereby further reducing a probability of contact between the coolant and the rotor 60. Therefore, in this embodiment, the blocking member 40 has an effect of preventing the coolant from coming into contact with the rotor 60. At the same time, in this embodiment, the coolant flows from the upper portion of the end portion 30 of the coil winding to the lower portion of the end portion 30 of the coil winding along the blocking member 40 or the coolant is guided to an area away from the rotor 60. In other words, in this embodiment, the blocking member 40 also has a guide effect.

In this embodiment, when there is one blocking member 40, the blocking member 40 may be disposed on the inner surface 301 or the outer surface 303 of one end portion 30 of the coil winding, so that one end of the rotor 60 is not in contact with the coolant. Compared with the prior art, kinetic energy consumption of the rotor 60 can still be reduced. In this embodiment, two blocking members 40 are shown in FIG. 1. In this case, the two blocking members 40 may be respectively located on the inner surface 301 or the outer surface 303 of the two end portions 30 of the coil winding. In this way, neither end of the rotor 60 is in contact with the coolant, thereby avoiding the problem of kinetic energy consumption of the rotor 60.

In this embodiment, it should be noted that when the blocking member 40 is disposed on the inner surface 301 or the outer surface 303 of the end portion 30 of the coil winding, the blocking member 40 may be disposed in one circle along the inner surface 301 or the outer surface 303 of the end portion 30 of the coil winding. In other words, the blocking member 40 is disposed on the entire inner surface 301 or the entire outer surface 303 of the end portion 30 of the coil winding. Alternatively, even though there is a coolant on the lower portion of the end portion 30 of the coil winding, the coolant cannot easily come into contact with the rotor 60 under the action of gravity. Therefore, only the coolant on the upper portion of the end portion 30 of the coil winding needs to be blocked from coming into contact with the rotor 60. Therefore, in this embodiment, the blocking member 40 may be disposed along the upper portion of the inner surface 301 or the outer surface 303 of the end portion 30 of the coil winding. In other words, the blocking member 40 partially covers the inner surface 301 or the outer surface 303 of the end portion 30 of the coil winding, so that the weight of the blocking member 40 can be reduced to further reduce the weight of the motor. Therefore, in this embodiment, the blocking member 40 covers at least the inner surface 301 or the outer surface 303 of the upper end portion 30 of the coil winding.

In this embodiment, as shown in FIG. 2, the first opening 11 may be an inlet of the cooling channel 20, and the second opening 12 may be an outlet of the cooling channel 20. In other words, the coolant enters at top and leaves at bottom. In this way, as shown by the solid arrows in FIG. 2, the coolant may enter the cooling channel 20 at the top end from the first opening 11 at the top end of the housing 10, and a part of the coolant flows to the end portion 30 of the coil winding through the nozzle 21, and a part of the coolant flows to the lower end of the cooling channel 20 as shown by the dashed arrows in FIG. 2. The coolant sprayed from the nozzle 21 flows to the underside of the end portion 30 of the coil winding and the area away from the rotor 60 under the blocking action of the blocking member 40, and finally converges to the bottom end in the housing 10. In this case, the coolant may flow into the cooling channel 20 at the bottom end again through the nozzle 21 at the bottom end of the cooling channel 20, and finally the coolant in the cooling channel 20 is discharged outward through the second opening 12 (or directly discharged outward from the second opening 12).

Alternatively, in this embodiment, as shown in FIG. 1, the second opening 12 may be an inlet of the cooling channel 20, and the first opening 11 may be an outlet of the cooling channel 20. In other words, the coolant enters at bottom and leaves at top. In this case, in order to discharge the coolant to from the first opening 11, the coolant usually has some pressure (for example, delivered to the second opening 12 by an oil pump), so that the coolant enters the cooling channel 20 from the second opening 12 under the action of pressure, a part of the coolant is sprayed from the nozzle 21 at the bottom end of the cooling channel 20 to the underside of the end portion 30 of the coil winding (as shown by the horizontal dashed arrows in FIG. 1), and a part of the coolant flows from the bottom end of the cooling channel 20 to the top end of the cooling channel 20 (as shown by the vertical dashed arrows in FIG. 1). Heat in the housing 10 is absorbed in the flow process. When the coolant reaches the top end of the cooling channel 20 (as shown by the upper horizontal dashed arrow in FIG. 1), a part of the coolant is discharged outward from the first opening 11, and a part of the coolant is sprayed from the nozzle 21 at the top end of the cooling channel 20 to the end portion 30 of the coil winding (as shown by the upper solid arrow in FIG. 1). In this case, the coolant flows to the underside of the end portion 30 of the coil winding and the area away from the rotor 60 under the blocking action of the blocking member 40, and finally, the coolant that cools the end portion 30 of the coil winding converges to the bottom end in the housing 10. In this case, the coolant may enter the cooling channel 20 from the nozzle 21 at the bottom end of the cooling channel 20 and flow outward from the second opening 12 or may be discharged directly outward through an additional discharging opening (not shown) at the bottom end of the housing 10.

Therefore, in the motor provided in this embodiment, the housing 10 has the cooling channel 20 that may be used for the coolant to flow through and whose two ends extend to the end portion 30 of the coil winding, the cooling channel 20 is in communication with the first opening 11 and the second opening 12 respectively provided at the top end and the bottom end of the housing 10, and the cooling channel 20 has the nozzle 21 at the position proximate the end portion 30 of the coil winding, where the nozzle 21 is configured to spray the coolant in the cooling channel 20 to the end portion 30 of the coil winding. The motor further includes at least one blocking member 40, where the blocking member 40 is located at least on the inner surface 301 or the outer surface 303 of the end portion 30 of the coil winding, and the blocking member 40 is configured to block the coolant sprayed from the nozzle 21 from coming into contact with the rotor 60, so that when the coolant in the cooling channel 20 is sprayed from the nozzle 21 to dissipate heat for the coil winding, the coolant cannot come into contact with the rotor 60 under the blocking action of the blocking member 40, and the coolant is guided by the blocking member 40 to an area away from the rotor 60 and a lower area of the end portion 30 of the coil winding, thereby avoiding the contact between the coolant and the rotor 60 while cooling the coil winding, and reducing or avoiding kinetic energy consumption of the rotor 60. Therefore, the motor provided in this embodiment prevents the coolant from penetrating or overflowing into the area of the rotor 60 from the end portion 30 of the coil winding, and avoids the problem of kinetic energy consumption caused by the rotor 60 in contact with the coolant, thereby resolving the problem of kinetic energy consumption of the rotor 60 caused when the rotor 60 in the existing motor sprays cooling oil to the end portion 30 of the coil under the centrifugal action.

In this embodiment, the blocking member 40 has a guide portion at a position proximate the top end of the housing 10 (for details, see a through hole 41a, an outer edge 42b, and an opening 41c described below). The guide portion is configured to guide a part of the coolant on the blocking member 40 to the bearing 51, so that the coolant flows through the bearing 51 to the end portion that is of the coil winding and that is proximate the bottom end of the housing 10 (namely, the lower semi-circular end portion 32 of the coil winding). In this way, a part of the coolant penetrating into the blocking member 40 is cooled along two ends of the blocking member 40 to the lower semi-circular end portion 32 of the coil winding, and a part of the coolant flows to the bearing 51 along the guide portion to dissipate heat for the bearing 51. Moreover, the coolant flowing through the bearing 51 flows to the lower end portion of the coil winding under the action of gravity, thereby cooling the lower end portion of the coil winding. Compared with the prior art in which the coolant flows through the upper end portion of the coil winding for cooling to the lower end portion of the coil winding for cooling, in this embodiment, because heat generated by the bearing 51 is far lower than heat generated by the coil winding, the coolant flowing through the bearing 51 can implement good heat dissipation on the lower end portion of the coil winding. Therefore, in this embodiment, balanced heat dissipation of the upper and lower end portions of the coil winding is achieved.

In this embodiment, the end portion 30 of the coil winding is usually a ring structure. In other words, the end portion 30 is surrounded by an upper semi-circular end portion 31 and a lower semi-circular end portion 32. When the coolant is on the upper semi-circular end portion 31, the coolant easily penetrates or overflows into an area of the rotor 60 under the action of gravity. However, when the coolant is on the lower semi-circular end portion 32, the coolant penetrates into the bottom end in the housing 10 under the action of gravity, so that the coolant usually cannot easily come into contact with the area of the rotor 60. Therefore, in order to prevent the coolant on the upper semi-circular end portion 31 of the coil winding from penetrating into the area of the rotor 60, as shown in FIG. 3, the blocking member 40 is a semi-arc structure arranged around at least the inner surface 301 or the outer surface 303 of the upper semi-circular end portion 31 of the coil winding. In other words, the blocking member 40 is a semi-arc structure. The semi-arc structure is located on the inner surface 301 or the outer surface 303 of the upper semi-circular end portion 31 of the coil winding, so that the semi-arc structure can block the coolant on the upper semi-circular end portion 31 of the coil winding, and prevent the coolant from penetrating or overflowing into the area of the rotor 60, and the semi-arc structure guides the coolant to the lower semi-circular end portion 32 of the coil winding.

In this embodiment, as shown in FIG. 4, the blocking member 40 is a semi-arc separator 40*a* arranged around the inner surface 301 of the upper semi-circular end portion 31 of the coil winding, one end of the semi-arc separator 40*a* is connected to the inner wall of the housing 10, and a space that may be used to accommodate the upper semi-circular end portion 31 of the coil winding is formed between an arc surface of the semi-arc separator 40*a* and the inner wall of the housing 10, so that the semi-arc separator 40*a* is located on the inner surface 301 of the upper semi-circular end portion 31 of the coil winding. In other words, in this embodiment, one end of the blocking member 40 is fixedly connected to the inner wall of the housing 10, and the other end of the blocking member 40 may extend to the inner surface 301 of the upper semi-circular end portion 31 of the coil winding. For example, in this embodiment, one end of the semi-arc separator 40*a* is connected to a side end face in the housing 10 (namely, a side face of the housing 10 to which the rotating shaft 50 is rotatably connected).

In this embodiment, as shown in FIG. 4, one end that is of the semi-arc separator 40*a* and that is connected to the housing 10 has a connection portion 42*a*, and the semi-arc separator 40*a* is connected to the inner wall of the housing 10 through the connection portion 42*a*. In this embodiment, the connection portion 42*a* is an outer edge formed by bending one end of the semi-arc separator 40*a*. The connection portion 42*a* and the arc surface of the semi-arc separator 40*a* may be vertically disposed, and a reinforcing rib is disposed between the connection portion 42*a* and the arc surface of the semi-arc separator 40*a*, to enhance the strength of the connection portion 42*a*. In this embodiment, the connection portion 42*a* and the inner wall of the housing 10 may be fastened and connected by using a fastener (such as a screw or bolt). For example, the connection portion 42*a* is provided with a threaded hole for the screw or bolt to pass through, and the screw or bolt passes through the threaded hole to fasten the blocking member 40 to the inner wall of the housing 10.

In this embodiment, the guide portion is a through hole 41*a* provided on the semi-arc separator 40*a* at a position proximate the connection portion 42*a*, and a projection area of the through hole 41*a* in a vertical direction is located on the bearing 51. In this way, when the coolant on the upper semi-circular end portion 31 of the coil winding flows to the semi-arc separator 40*a*, a part of the coolant flows to the bearing 51 through the through hole 41*a*, and the rest of the coolant flows to the lower semi-circular end portion 32 of the coil winding along the semi-arc separator 40*a*. In this embodiment, through the contact between the coolant and the bearing 51, a heat dissipation capability of the bearing 51 at a high rotating speed is enhanced, and balanced heat dissipation of the upper and lower end portions of the coil winding is implemented.

In this embodiment, in order to facilitate the coolant flowing from the through hole 41*a* to centrally dissipate heat for the bearing 51, an oil collecting groove (not shown) is provided on the housing 10 at a position proximate the top end of the bearing 51 or on the top end of the bearing 51. The oil collecting groove is configured to collect the coolant flowing to the bearing 51, so that the coolant flows into the bearing 51. In other words, in this embodiment, the coolant flowing from the through hole 41*a* is centrally guided to the bearing 51 by the oil collecting groove, thereby effectively dissipating heat for the bearing 51. In this embodiment, the oil collecting groove may be provided at the top end of the bearing 51, or the oil collecting groove may be provided at the side end face of the housing 10 above the bearing 51, so that when the coolant has some pressure, the coolant discharged from the through hole 41*a* can be centrally collected to the oil collecting groove.

In the prior art, during cooling of the motor, when the coolant in the metal pipe is sprayed to the stator 70, the rotor 60, and the coil winding, the coolant cools the upper semi-circular end portion 31 of the coil winding and then flows to the lower semi-circular end portion 32 of the coil winding. In this way, the problem of unbalanced heat dissipation of the upper and lower end portions of the end portion 30 of the coil winding usually occurs. In order to further resolve the problem of unbalanced heat dissipation of the upper and lower end portions of the coil winding, in this embodiment, as shown in FIG. 9, a guide groove 13 is provided in the housing 10 at a position proximate the bottom end of the bearing 51. The guide groove 13 is configured to guide the coolant on the bearing 51 into the lower semi-circular end portion 32 of the coil winding, so that the coolant can cool the lower semi-circular end portion 32 of the coil winding. Compared with the prior art, in this embodiment, a part of the coolant flows directly from the through hole 41*a* to the bearing 51. However, heat of the bearing 51 is far lower than heat of the coil winding. Therefore, the temperature rise of the coolant after flowing through the bearing 51 is not very high. The coolant flows to the lower semi-circular end portion 32 of the coil winding under the guide action of the guide groove 13, to dissipate heat for the lower semi-circular end portion 32 of the coil winding, thereby implementing balanced heat dissipation of the upper and lower end portions of the coil winding.

In this embodiment, after the guide groove 13 guides the coolant to the lower semi-circular end portion 32 of the coil winding, the coolant is usually concentrated at the end portion 30 of the coil winding proximate the guide groove 13. In this embodiment, in order to implement good heat dissipation for the lower semi-circular end portion 32 of the coil winding, as shown in FIG. 5 and FIG. 9, the motor further includes an oil guide member 110. The oil guide member 110 is disposed on the inner surface 301 of the lower semi-circular end portion 32 of the coil winding, one end of the oil guide member 110 is proximate the guide groove and fixedly connected to the inner wall of the housing, and the other end extends to the rotor 60. The oil guide member 110 is provided with an orifice 112 that may be used for the coolant to flow through, so that the coolant flows to the inner surface 301 that is of the lower semi-circular end portion 32 of the coil winding and that is proximate the rotor 60 under the guide of the oil guide member 110, and the coolant penetrates to the lower semi-circular end portion 32 of the coil winding through the orifice 112, to implement balanced heat dissipation of the lower semi-circular end portion 32 of the coil winding.

In this embodiment, as shown in FIG. 5 and FIG. 9, the oil guide member 110 is an arc plate matching the inner surface 301 of the lower semi-circular end portion 32 of the coil winding. For example, the oil guide member 110 may be fixed on the inner surface 301 of the lower semi-circular end portion 32 of the coil winding by using a fastener. In this embodiment, when the oil guide member 110 is disposed on the inner surface 301 of the lower semi-circular end portion 32 of the coil winding, the oil guide member 110 partially covers the inner surface 301 of the lower semi-circular end portion 32 of the coil winding. In other words, there is a gap between two ends of the oil guide member 110 and two ends of the semi-arc separator 40*a*.

In this embodiment, as shown in FIG. 9, a protrusion 111 is provided on an edge that is of one end of the oil guide member 110 and that is proximate the rotor 60, and the protrusion 111 is configured to block the coolant on the oil guide member 110 from flowing into the rotor 60. In other words, in this embodiment, the protrusion 111 on the oil guide member 110 prevents the coolant on the oil guide member 110 from coming into contact with the rotor 60, thereby further avoiding kinetic energy consumption of the rotor 60.

In this embodiment, the oil guide member 110 and the blocking member 40 may be plastic parts, to be insulated from the coil winding.

In this embodiment, during disposing of the cooling channel 20 in the housing 10, an outer wall of the stator 70 and an inner surface 301 of the housing 10 may be surrounded to form the cooling channel 20. In other words, a gap exists between the outer wall of the stator 70 and the inner wall of the housing 10, and the gap may serve as the cooling channel 20, so that when the coolant enters the cooling channel 20, the coolant may directly come into contact with the outer wall of the stator 70 to dissipate heat for the stator 70. At the same time, a nozzle 21 is formed between the two ends of the stator 70 and the inner surface 301 of the housing 10. For example, the two ends of the stator 70 and the inner wall of the housing 10 are open. In this embodiment, the nozzle 21 is an annular opening, so that when the coolant enters the cooling channel 20, a part of the coolant flows from the top end of the cooling channel 20 to the bottom end (or from the bottom end of the cooling channel 20 to the top end) while a part of the coolant flows laterally in the cooling channel 20 and is finally sprayed from the nozzle 21 to the end portion 30 of the coil winding to cool the end portion 30 of the coil winding.

Alternatively, in this embodiment, a groove (not shown) may be provided on an inner wall that is of the housing 10 and that is proximate the stator 70, the groove and the outer wall of the stator 70 are surrounded to form the cooling channel 20, and a notch that is on the groove and that is proximate the end portion 30 of the coil winding forms the nozzle 21. In other words, in this embodiment, the cooling channel 20 is surrounded by the groove on the inner wall of the housing 10 and the outer wall of the stator 70. Compared with the prior art in which a metal pipe is disposed inside the housing 10 of the motor, in this embodiment, the groove provided on the inner wall of the housing 10 greatly reduces manufacturing difficulty.

Alternatively, in this embodiment, a cooling channel 20 is disposed in an inner wall that is of the housing 10 and that is proximate the stator 70, and a nozzle 21 in communication with the cooling channel 20 is provided on the inner wall of the housing 10. In other words, in this embodiment, the cooling channel 20 is located in the inner wall of the housing 10, and the nozzle 21 is located on the inner wall of the housing 10 and corresponds to the end portion 30 of the coil winding, so that the coolant sprayed from the nozzle 21 is easily sprayed to the end portion 30 of the coil winding.

In this embodiment, to facilitate assembly, the housing 10 includes an intermediate housing and a front end cover and a rear end cover that are located at two ends of the intermediate housing. In other words, the front end cover is located at one end of the intermediate housing, the rear end cover is located at the other end of the intermediate housing, inner walls of the intermediate housing, the front end cover, and the rear end cover are surrounded to form a cavity that may be used for accommodating the stator 70, the coil winding, the rotor 60, and the rotating shaft 50. Two ends of the rotating shaft 50 are respectively rotatably connected to the front end cover and the rear end cover by using the bearing 51, and one end of the rotating shaft 50 may extend from the front end cover to be connected to a load. During disposing of the cooling channel 20, the cooling channel 20 may be disposed in the intermediate housing or between the intermediate housing and the outer wall of the stator 70. In this case, the first opening 11 and the second opening 12 are provided at a top end and a bottom end of the intermediate housing.

In this embodiment, in order to ensure the flow of the coolant in the cooling channel 20, as shown in FIG. 16, the motor further includes an oil pump 80. An inlet of the oil pump 80 is in communication with one of the first opening 11 and the second opening 12, and an outlet of the oil pump 80 is in communication with the other of the first opening 11 and the second opening 12. For example, when the first opening 11 is an inlet, the outlet of the oil pump 80 is in communication with the first opening 11, and the inlet of the oil pump 80 is in communication with the second opening 12, and when the second opening 12 is an inlet, the outlet of the oil pump 80 is connected to the second opening 12, and the inlet of the oil pump 80 is connected to the first opening 11. By disposing the oil pump 80, on one hand, the flow of the coolant in the cooling channel 20 can be ensured; on the other hand, the flow rate of the coolant in the cooling channel 20 can be controlled. For example, when the temperature of the coil winding is relatively high, the flow rate of the coolant in the cooling channel 20 can be increased, so that the coolant quickly takes heat out of the motor, to implement good heat dissipation for the motor.

Figure 17:
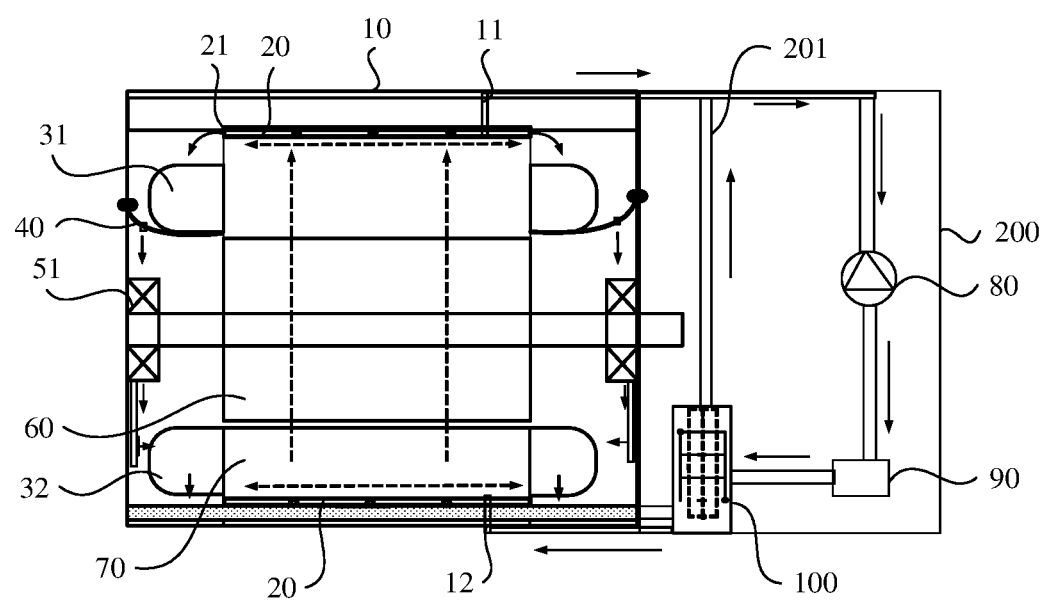
FIG. 17 is a schematic structural diagram of a powertrain according to Embodiment 4.

In this embodiment, the oil pump 80 is disposed outside the housing 10 of the motor. As shown in FIG. 17, the oil pump 80 is disposed in a reducer 200.

In this embodiment, as shown in FIG. 16, the motor further includes a heat exchanger 100. The heat exchanger 100 is configured to cool the coolant discharged from the cooling channel 20, so that after cooling, the coolant may re-enter the cooling channel 20 to cool the motor. In this embodiment, the heat exchanger 100 may be an oil-water heat exchanger 100. In other words, the coolant is cooled in a water cooling manner. In this embodiment, the coolant is cooling oil.

In this embodiment, as shown in FIG. 16, the motor further includes a filter 90. The filter 90 is configured to filter the coolant, to avoid blocking of the cooling channel 20, the first opening 11, and the second opening 12 caused by impurities in the coolant. In this embodiment, the heat exchanger 100 and the filter 90 may both be located outside the housing 10 of the motor, for example, located in the reducer 200. In this embodiment, it should be noted that when the oil pump 80, the heat exchanger 100, and the filter 90 are all located in the reducer 200, the first opening 11 and the second opening 12 on the motor may be further used to communicate with the heat dissipation channel 201 in the reducer 200, so that the cooling channel 20 in the motor and the heat dissipation channel 201 in the reducer 200 form a cooling loop. The oil pump 80, the heat exchanger 100, and the filter 90 may be located on a loop of the cooling loop in the reducer 200.

Figure 11:
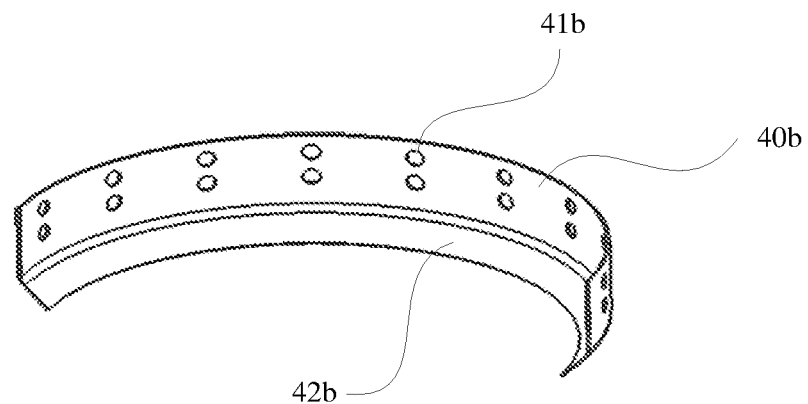
FIG. 11 is a schematic structural diagram of a blocking member in a motor according to Embodiment 2.
Figure 12:
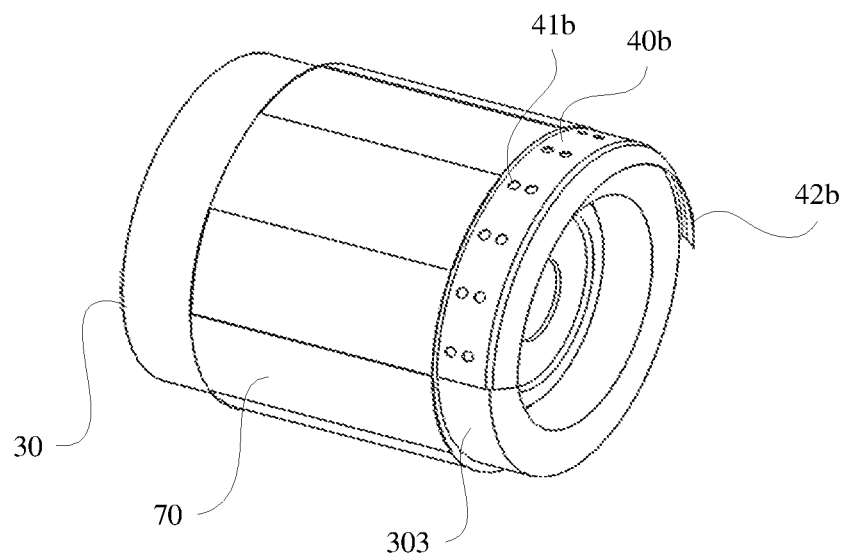
FIG. 12 is a schematic structural diagram of a blocking member and a stator in a motor according to Embodiment 2.
Figure 13:
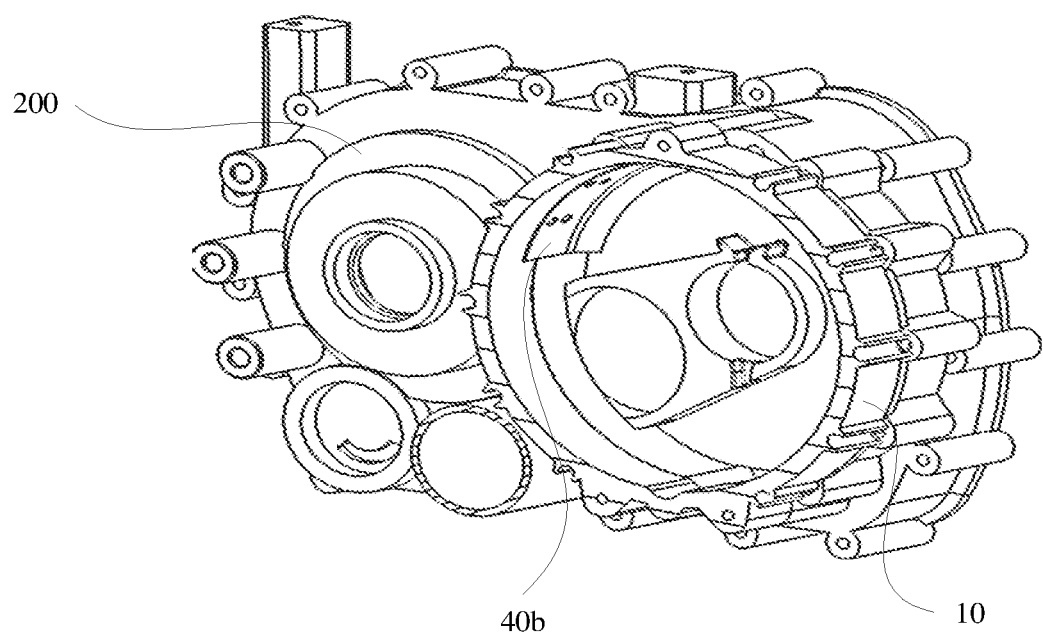
FIG. 13 is a schematic structural diagram between a blocking member in a motor and an inner wall of a housing according to Embodiment 2.

With respect to Embodiment 2, FIG. 11 is a schematic structural diagram of a blocking member in a motor, FIG. 12 is a schematic structural diagram of a blocking member and a stator in a motor, and FIG. 13 is a schematic structural diagram between a blocking member in a motor and an inner wall of a housing.

The difference between this embodiment and the foregoing embodiment is, in this embodiment, as shown in FIG. 11 to FIG. 13, the blocking member 40 is a semi-arc plate 40b arranged around the outer surface 303 of the upper semi-circular end portion 31 of the coil winding. The semi-arc plate 40b is connected to the inner wall of the housing 10. In other words, in this embodiment, the blocking member 40 is fixed on the inner wall of the housing 10 and is arranged around the outer surface 303 of the upper semi-circular end portion 31 of the coil winding. At the same time, in this embodiment, in order to enable the semi-arc plate 40b to block the coolant from coming into contact with the rotor 60, in this embodiment, a gap in communication with the nozzle 21 of the cooling channel 20 is formed between the semi-arc plate 40b and the inner wall of the housing 10. In this way, the coolant sprayed from the nozzle 21 at the top end of the cooling channel 20 enters the gap, and the coolant flows along the semi-arc plate 40b to the bearing 51 and the lower semi-circular end portion 32 of the coil winding. In other words, the semi-arc plate 40b has a guide effect, which avoids the contact between the coolant and the rotor 60, thereby avoiding kinetic energy consumption of the rotor 60.

In this embodiment, when the semi-arc plate 40b is arranged around the outer surface 303 of the upper semi-circular end portion 31 of the coil winding, the upper semi-circular end portion 31 of the coil winding cannot come into contact with the coolant. In this way, the upper semi-circular end portion 31 of the coil winding can only be cooled by the coolant flowing through the semi-arc plate 40b. However, a cooling effect of the upper semi-circular end portion 31 of the coil winding is poor. Therefore, in this embodiment, the semi-arc plate 40b is provided with a plurality of holes 41b to allow a part of the coolant in the gap to penetrate into the upper semi-circular end portion 31 of the coil winding, so that a part of the coolant penetrates into the upper semi-circular end portion 31 of the coil winding for cooling. However, it should be noted that when the coolant penetrates into the upper semi-circular end portion 31 of the coil winding from the holes 41b on the semi-arc plate 40b, the amount of the coolant that penetrates into the upper semi-circular end portion 31 of the coil winding is usually relatively small, so that a relatively small amount of coolant may usually come into contact with the rotor 60. However, compared with the prior art, in this embodiment, kinetic energy consumption of the rotor 60 can still be reduced.

In this embodiment, in order to implement good heat dissipation for the bearing 51, the guide portion is an outer edge 42b that is inclined downward (for example, inclined downward to the bearing 51) and that is formed by one end of the semi-arc plate 40b extending outward to the side end face of the housing 10. The outer edge 42b is configured to guide a part of the coolant in the gap to the bearing 51. For example, in this embodiment, the outer edge 42b at least partially overlaps with the bearing 51 in a vertical direction, so that a part of the coolant between the semi-arc plate 40b and the inner wall of the housing 10 is guided by the outer edge 42b, so that the coolant flowing out of the outer edge 42b may finally flow to the bearing 51, thereby dissipating heat for the bearing 51.

In this embodiment, when the semi-arc plate 40b is located on the outer surface 303 of the upper semi-circular end portion 31 of the coil winding and the outer edge 42b inclined downward is provided at one end of the semi-arc plate 40b, a part of the coolant is directly guided to the bearing 51 along the semi-arc plate 40b, so that the coolant flowing to the bearing 51 does not come into contact with the end portion of the coil winding. In other words, in this embodiment, pipes for cooling the coil winding and the bearing 51 respectively are formed. At the same time, two ends of the semi-arc plate 40b directly guide a part of the coolant to the lower semi-circular end portion 32 of the coil winding, and guide the coolant that cools the bearing 51 to the lower semi-circular end portion 32 of the coil winding through the guide groove 13 and the oil guide member 110, to cool the lower semi-circular end portion 32 of the coil winding. Compared with the prior art, in this embodiment, the problem of unbalanced heat dissipation of the upper and lower end portions of the coil winding caused by the coolant flowing to the lower semi-circular end portion 32 of the coil winding for cooling after coming into contact with the upper semi-circular end portion 31 of the coil winding is avoided.

For details about the oil collecting groove, the guide groove 13, and the oil guide member 110 in this embodiment, refer to in the foregoing embodiment. Details are not described in this embodiment.

Figure 14:
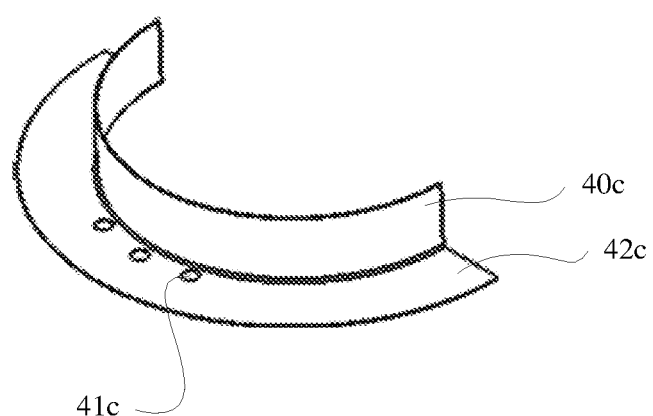
FIG. 14 is a schematic structural diagram of a blocking member in a motor according to Embodiment 3.
Figure 15:
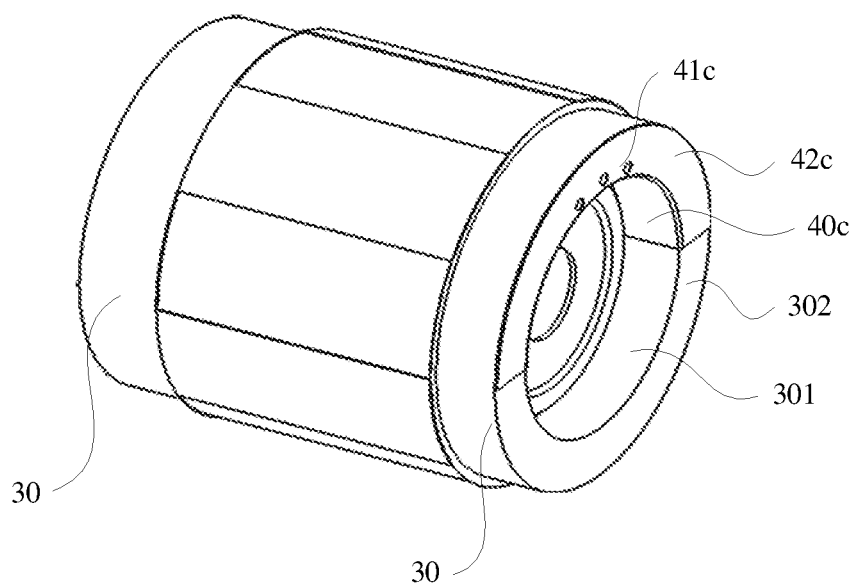
FIG. 15 is a schematic structural diagram of a blocking member and a stator in a motor according to Embodiment 3.

With respect to Embodiment 3, FIG. 14 is a schematic structural diagram of a blocking member in a motor, and FIG. 15 is a schematic structural diagram of a blocking member and a stator in a motor.

The difference between this embodiment and the foregoing embodiments is, in this embodiment, as shown in FIG. 14 and FIG. 15, a blocking member 40 is a semi-arc oil-wrapped cloth 40c wrapped on the inner surface 301 of the upper semi-circular end portion 31 of the coil winding. In other words, the blocking member 40 is an oil-wrapped cloth 40c, and the oil-wrapped cloth 40c is wrapped on the inner surface 301 of the upper semi-circular end portion 31 of the coil winding, so that the oil-wrapped cloth 40c blocks the coolant and prevents the coolant from coming into contact with the rotor 60. In this embodiment, the oil-wrapped cloth 40c is an existing material. In this embodiment, when the blocking member 40 is a rigid material, fitting between the blocking member 40 and the end portion of the coil winding needs to be well controlled in an installation process. In other words, the required installation precision is relatively high. Once the blocking member 40 is incorrectly installed or the shape of the blocking member 40 is deformed, the blocking member 40 and the end portion of the coil winding cannot be well fitted. However, in this embodiment, when the blocking member 40 adopts the oil-wrapped cloth 40c, because the oil-wrapped cloth 40c is a flexible material, during assembly, the oil-wrapped cloth 40c can be directly wrapped on the end portion of the coil winding, and an installation position of the oil-wrapped cloth 40c can be adjusted at any time, thereby greatly reducing the difficulty of fitting between the blocking member 40 and the end portion of the coil winding and implementing convenient installation.

In this embodiment, one end that is of the oil-wrapped cloth 40c and that is proximate the outer side face 302 of the end portion 30 of the coil winding has an extension portion 42c extending to the outer side face 302 of the upper semi-circular end portion 31 of the coil winding, and, in this embodiment, the guide portion is an opening 41c provided on the extension portion 42c, so that the coolant sprayed to the coil winding is guided to the bearing 51. In this way, the coolant on the upper semi-circular end portion 31 of the coil winding flows to the bearing 51 through the opening 41c at the extension portion 42c, thereby dissipating heat for the bearing 51. At the same time, after flowing through the bearing 51 for heat dissipation, the coolant flows to the lower semi-circular end portion 32 of the coil winding through the guide groove 13 and the oil guide member 110, to cool the upper and lower end portions of the coil winding.

With respect to Embodiment 4, FIG. 17 is a schematic structural diagram of a powertrain.

This embodiment provides a powertrain. The powertrain provided in this embodiment may be applied to an electric motor vehicle/electric vehicle (EV), a pure electric vehicle (PEV/BEV), a hybrid electric vehicle (HEV), a range extended electric vehicle (REEV), a plug-in hybrid electric vehicle (PHEV)), a new energy vehicle, or the like, or may be applied to a device such as battery management, motor & driver, or a power converter. As shown in FIG. 17, the powertrain includes at least the motor according to any one of the foregoing embodiments and a reducer 200 connected to a rotating shaft 50 of the motor. A heat dissipation channel 201 is disposed in the reducer 200, and a cooling loop is formed between the heat dissipation channel 201 and a cooling channel 20 in the motor. In other words, the motor and the reducer 200 perform heat dissipation by using an integrated cooling system, to cool the motor while cooling the reducer 200. In this embodiment, for details of other components in the reducer 200, refer to the structure of the existing reducer 200. In this embodiment, the difference from the existing reducer is: In this embodiment, a heat dissipation channel 201 that forms the cooling loop with the cooling channel 20 in the motor is disposed in the reducer 200, and heat dissipation is implemented for components in the reducer 200 by using the heat dissipation channel 201.

The oil pump 80, the heat exchanger 100, and the filter 90 in the foregoing embodiments are located in the reducer 200. In other words, in this embodiment, the oil pump 80, the heat exchanger 100, and the filter 90 in the cooling system are disposed in the reducer 200, circulation and heat dissipation of the cooling loop are implemented by the oil pump 80, and the coolant in the cooling loop may be cooled by the heat exchanger 100, thereby implementing good heat dissipation for the motor and the reducer 200. Correspondingly, the filter 90 filters the coolant in the cooling loop. In this embodiment, the coolant is cooling oil. In other words, the motor and the reducer 200 in the powertrain adopt an oil cooling system. In this embodiment, it should be noted that when the powertrain is applied to an electric vehicle, a microcontroller unit (MCU) is controlled to perform heat dissipation in a water cooling manner. In this way, a water outlet of the MCU may be connected to the heat exchanger 100, and a water outlet of the heat exchanger 100 is connected to a water outlet of the reducer 200.

Therefore, in the powertrain provided in this embodiment, by including the motor and the reducer 200, kinetic energy consumption of the rotor 60 at a high rotating speed is avoided, balanced heat dissipation at the upper and lower end portions of the coil winding in the motor is implemented, and integrated cooling of the motor and the reducer 200 is implemented, so that the heat dissipation of the powertrain is better.

In this embodiment, the housing of the motor (for example, the front end cover in the housing of the motor) and the housing of the reducer may be fixed together by using a fastener (for example, a screw or a bolt) to form an integral structure. For example, as shown in FIG. 7, FIG. 8, and FIG. 13, the motor and the reducer are fixed together as a whole.

With respect to Embodiment 5, this embodiment provides a vehicle, where the vehicle provided in this embodiment may be an electric vehicle/electric vehicle (EV), a pure electric vehicle (PEV/BEV), a hybrid electric vehicle (HEV), a range extended electric vehicle (REEV), a plug-in hybrid electric vehicle (PHEV), a new energy vehicle, or the like.

The vehicle includes at least wheels, a transmission component, and the motor according to any one of the foregoing embodiments. A rotating shaft 50 of the motor is connected to the wheels through the transmission component, so that the rotating shaft 50 of the motor rotates to output power, and the transmission component transmits power to the wheels, so that the wheels rotate. In this embodiment, it should be noted that there may be one or two motors included in the vehicle. When there is one motor, the motor is connected to the two front wheels or the two rear wheels through the transmission component. When the motor is connected to the two front wheels through the transmission component, the front wheels are driving wheels, and the rear wheels are driven wheels. Correspondingly, when the motor is connected with the two rear wheels through the transmission component, the rear wheels are driving wheels and the front wheels are driven wheels. When there are two motors, one of the motors is connected to the two front wheels through the transmission component and the other motor is connected to the two rear wheels through another transmission component.

In a possible implementation, the transmission component may include a gearbox and a half shaft, the rotating shaft 50 of the motor is connected to the gearbox, and the gearbox is separately connected to the two front wheels or the two rear wheels through the half shaft.

It should be understood that, in addition to the wheels, the transmission components, and the motor, the vehicle provided in this embodiment may further include a control board, a vehicle body, and the like. In this embodiment, for other structures of the vehicle, refer to the prior art, and details are not described in this embodiment.

In the vehicle provided in this embodiment, by including the motor, the contact between a rotor of the motor and a coolant is blocked, thereby avoiding kinetic energy consumption in a rotation process of the rotor of the motor, so that a rotating speed of the rotor of the motor is faster, and kinetic energy output by the rotating shaft is greater. In this way, power of the vehicle is greater.

In the description of the embodiments, it should be noted that, unless otherwise expressly specified and limited, the terms "installation", "connect", and "connection" should be understood in a broad sense, for example, may be a fixed connection, or may be an indirect connection by using an intermediate medium, or may be a communication between two elements or an interaction between two elements. A person of ordinary skill in the art may understand specific meanings of the foregoing terms in the embodiments according to specific situations.

The device or element referred to in or implied in the embodiments needs to have a specific orientation, be constructed and operated in a specific orientation, and therefore cannot be construed as a limitation on the embodiments. In the description of the embodiments, "a plurality of" means two or more unless it is specifically specified otherwise.

In the embodiments, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Finally, it should be noted that the foregoing embodiments are merely intended for describing the solutions of the embodiments and are non-limiting. Although aspects are described in detail with reference to the foregoing embodiments, persons of ordinary skill in the art should understand that they may still make modifications to the solutions described in the foregoing embodiments or make equivalent replacements to some or all features thereof, without departing from the scope of the solutions of the embodiments.

What is claimed is:

1. A motor, comprising a housing, a rotating shaft, a rotor, and a stator that are sequentially sleeved are disposed in the housing, a coil winding is arranged around the stator, and two ends of the rotating shaft are respectively rotatably connected to two opposite side end faces of the housing by using a bearing;

the housing has a cooling channel that is used for a coolant to flow through and whose two ends extend to an end portion of the coil winding, the cooling channel is in communication with a first opening and a second opening respectively provided at a top end and a bottom end of the housing, and the cooling channel has a nozzle at a position proximate the end portion of the coil winding, wherein the nozzle is configured to spray the coolant in the cooling channel to the end portion of the coil winding, and the housing is provided with an oil collecting groove at a position proximate a top end of the bearing or on a top end of the bearing, and the oil collecting groove is configured to collect the coolant flowing to the bearing, so that the coolant flows into the bearing; and the motor further comprises:

at least one blocking member, wherein the blocking member is located at least on an inner surface or an outer surface of the end portion of the coil winding, and the blocking member is blocked between the nozzle and the rotor, wherein the housing is provided with a guide groove at a position proximate a bottom end of the bearing, and the guide groove is configured to guide the coolant on the bearing into a lower semi-circular end portion of the coil winding, and the motor further comprises an oil guide member, wherein the oil guide member is disposed on the inner surface of an lower semi-circular end portion of the coil winding, one end of the oil guide member is proximate the guide groove, an inner surface of the lower semi-circular end portion, and an orifice that is used for the coolant to flow through is provided on the oil guide member, so that the coolant penetrates into a bottom side of the lower semi-circular end portion of the coil winding.

2. The motor according to claim 1, wherein the blocking member has a guide portion at a position proximate the top end of the housing, the guide portion is configured to guide a part of the coolant on the blocking member to the bearing so that the coolant flows through the bearing to an end portion that is of the coil winding and that is proximate the bottom end of the housing.

3. The motor according to claim 2, wherein the blocking member is a semi-arc structure arranged around at least an inner surface or an outer surface of an upper semi-circular end portion of the coil winding.

4. The motor according to claim 3, wherein the blocking member is a semi-arc separator arranged around an inner surface of the upper semi-circular end portion of the coil winding, one end of the semi-arc separator is connected to an inner wall of the housing, and a space that may be accommodated by the upper semi-circular end portion of the coil winding is formed between an arc surface of the semi-arc separator and the inner wall of the housing, so that the semi-arc separator is located on the inner surface of the upper semi-circular end portion of the coil winding.

5. The motor according to claim 4, wherein one end of the semi-arc separator that is connected to the housing has a connection portion, and the semi-arc separator is connected to the inner wall of the housing by using the connection portion.

6. The motor according to claim 5, wherein the guide portion is a through hole provided on the semi-arc separator at a position proximate the connection portion, and a projection area of the through hole in a vertical direction is located on the bearing, so that the coolant flows to the bearing through the through hole.

7. The motor according to claim 3, wherein the blocking member is a semi-arc plate arranged around the outer surface of the upper semi-circular end portion of the coil winding, the semi-arc plate is connected to an inner wall of the housing, and a gap in communication with the nozzle of the cooling channel is formed between the semi-arc plate and the inner wall of the housing, so that the coolant flows along the semi-arc plate to the bearing and the lower semi-circular end portion of the coil winding.

8. The motor according to claim 7, wherein the guide portion is an outer edge that is inclined downward and that is formed by one end of the semi-arc plate extending outward to the side end face of the housing, and the outer edge at least partially overlaps with the bearing in a vertical direction, so that a part of the coolant in the gap flows to the bearing through the outer edge.

9. The motor according to claim 8, wherein a plurality of holes are provided on the semi-arc plate, so that a part of the coolant in the gap penetrates into the end portion of the coil winding.

10. The motor according to claim 1, wherein a protrusion is provided on an edge that is of one end of the oil guide member and that is proximate the rotor, and the protrusion is configured to block the coolant on the oil guide member from flowing into the rotor.

11. The motor according to claim 1, wherein an outer wall of the stator and an inner surface of the housing are surrounded to form the cooling channel, and the nozzle is formed between two ends of the stator and the inner surface of the housing.

12. A powertrain, comprising a motor, the motor comprises a housing, a rotating shaft, a rotor, and a stator that are sequentially sleeved are disposed in the housing, a coil winding is arranged around the stator, and two ends of the rotating shaft are respectively rotatably connected to two opposite side end faces of the housing by using a bearing;

the housing has a cooling channel that is used for a coolant to flow through and whose two ends extend to an end portion of the coil winding, the cooling channel is in communication with a first opening and a second opening respectively provided at a top end and a bottom end of the housing, and the cooling channel has a nozzle at a position proximate the end portion of the coil winding, wherein the nozzle is configured to spray the coolant in the cooling channel to the end portion of the coil winding, and the housing is further provided with an oil collecting groove at a position proximate a top end of the bearing or on a top end of the bearing, and the oil collecting groove is configured to collect the coolant flowing to the bearing, so that the coolant flows into the bearing; and the motor further comprises:

at least one blocking member, wherein the blocking member is located at least on an inner surface or an outer surface of the end portion of the coil winding, and the blocking member is blocked between the nozzle and the rotor;

the powertrain further comprises a reducer connected to a rotating shaft of the motor, wherein a heat dissipation channel is disposed in the reducer, and the heat dissipation channel and a cooling channel in the motor form a cooling loop, wherein the housing is provided with a guide groove at a position proximate a bottom end of the bearing, and the guide groove is configured to guide the coolant on the bearing into a lower semi-circular end portion of the coil winding, and the motor further comprises an oil guide member, wherein the oil guide member is disposed on an inner surface of the lower semi-circular end portion of the coil winding, one end of the oil guide member is proximate the guide groove, an other end of the oil guide member is proximate the rotor, and an orifice that is used for the coolant to flow through is provided on the oil guide member, so that the coolant penetrates into a bottom side of the lower semi-circular end portion of the coil winding.

13. The powertrain according to claim 12, wherein the blocking member has a guide portion at a position proximate the top end of the housing, the guide portion is configured to guide a part of the coolant on the blocking member to the bearing, so that the coolant flows through the bearing to an end portion that is of the coil winding and that is close to the bottom end of the housing.

14. The powertrain according to claim 13, wherein the blocking member is a semi-arc structure arranged around at least an inner surface or an outer surface of an upper semi-circular end portion of the coil winding.

15. The powertrain according to claim 12, wherein an oil pump, a heat exchanger, and a filter in the motor are located in the reducer.

16. A vehicle, comprising wheels, a transmission component, and a motor, the motor comprising a housing, a rotating shaft, a rotor, and a stator that are sequentially sleeved are disposed in the housing, a coil winding is arranged around the stator, and two ends of the rotating shaft are respectively rotatably connected to two opposite side end faces of the housing by using a bearing;

the housing has a cooling channel that is used for a coolant to flow through and whose two ends extend to an end portion of the coil winding, the cooling channel is in communication with a first opening and a second opening respectively provided at a top end and a bottom end of the housing, and the cooling channel has a nozzle at a position proximate the end portion of the coil winding, wherein the nozzle is configured to spray the coolant in the cooling channel to the end portion of the coil winding, and the housing is provided with an oil collecting groove at a position proximate a top end of the bearing or on a top end of the bearing, and the oil collecting groove is configured to collect the coolant flowing to the bearing, so that the coolant flows into the bearing; and the motor further comprises:

at least one blocking member, wherein the blocking member is located at least on an inner surface or an outer surface of the end portion of the coil winding, and the blocking member is blocked between the nozzle and the rotor;

wherein a rotating shaft of the motor is connected to the wheels by using the transmission component, wherein the housing is provided with a guide groove at a position proximate a bottom end of the bearing, and the guide groove is configured to guide the coolant on the bearing into a lower semi-circular end portion of the coil winding, and the motor further comprises an oil guide member, wherein the oil guide member is disposed on an inner surface of the lower semi-circular end portion of the coil winding, one end of the oil guide member is proximate the guide groove, an other end of the oil guide member is proximate the rotor, and an orifice that is used for the coolant to flow through is provided on the oil guide member, so that the coolant penetrates into a bottom side of the lower semi-circular end portion of the coil winding.

17. The vehicle according to claim 16, wherein the blocking member has a guide portion at a position proximate the top end of the housing, the guide portion is configured to guide a part of the coolant on the blocking member to the bearing, so that the coolant flows through the bearing to an end portion that is of the coil winding and that is proximate the bottom end of the housing.

* * * * *